US012524161B2

(12) United States Patent
Simsek-Ege et al.

(10) Patent No.: US 12,524,161 B2
(45) Date of Patent: *Jan. 13, 2026

(54) DATA TRANSMISSION MANAGEMENT

(71) Applicant: Micron Technology, Inc., Boise, ID (US)

(72) Inventors: Fatma Arzum Simsek-Ege, Boise, ID (US); Carly M. Wantulok, Boise, ID (US); Sumana Adusumilli, Boise, ID (US); Chiara Cerafogli, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/379,343

(22) Filed: Oct. 12, 2023

(65) Prior Publication Data

US 2024/0036743 A1 Feb. 1, 2024

Related U.S. Application Data

(62) Division of application No. 17/236,183, filed on Apr. 21, 2021, now Pat. No. 11,797,192.

(51) Int. Cl.
*G06F 3/06* (2006.01)
*G06N 20/00* (2019.01)

(52) U.S. Cl.
CPC .......... *G06F 3/0619* (2013.01); *G06F 3/0623* (2013.01); *G06F 3/0656* (2013.01); *G06F 3/0659* (2013.01); *G06F 3/067* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 10,771,553 | B2 | 9/2020 | Huang et al. |
| 10,915,445 | B2 | 2/2021 | Gandhi et al. |
| 2017/0041342 | A1 | 2/2017 | Efremov et al. |
| 2017/0116343 | A1 | 4/2017 | Wu et al. |
| 2017/0289800 | A1* | 10/2017 | Frusina ............... H04L 63/0876 |

(Continued)

FOREIGN PATENT DOCUMENTS

CN 105721461 A 6/2016

*Primary Examiner* — Baboucarr Faal
(74) *Attorney, Agent, or Firm* — Brooks, Cameron & Huebsch, PLLC

(57) ABSTRACT

Methods, apparatuses, and non-transitory machine-readable media associated with data transmission are described. Data transmission management can include receiving, from an edge device via a radio at a first device, instructions associated with data transmission between a second device in communication with the first device and a cloud service in communication with the first device. Data transmission management can also include managing, at the first device and based on the instructions from the edge device, data received from a memory resource of the second device for transmission to the cloud service and data received from the cloud service for transmission to the memory resource of the second device. Data transmission management can further include enabling transmission of some, none, or all of the data between the cloud service and the memory resource of the second device and vice versa based on the management of the data.

16 Claims, 4 Drawing Sheets

(56) References Cited

U.S. PATENT DOCUMENTS

| | | |
|---|---|---|
| 2019/0273510 A1 | 9/2019 | Elkind et al. |
| 2020/0244770 A1* | 7/2020 | Cooley ............... H04L 41/5054 |
| 2021/0060787 A1 | 3/2021 | Qin et al. |
| 2021/0097000 A1 | 4/2021 | Dutta |
| 2021/0110508 A1 | 4/2021 | Mellempudi |
| 2021/0126777 A1 | 4/2021 | Mash |
| 2021/0178595 A1* | 6/2021 | Arora .................... B25J 9/1679 |
| 2021/0331534 A1* | 10/2021 | Fujii .................. B60C 23/0416 |

* cited by examiner

DATA TRANSMISSION MANAGEMENT

PRIORITY INFORMATION

This application is a Divisional Application of U.S. application Ser. No. 17/236,183 filed on Apr. 21, 2021, the contents of which are incorporated herein by reference.

TECHNICAL FIELD

The present disclosure relates generally to apparatuses, non-transitory machine-readable media, and methods associated with data transmission management.

BACKGROUND

Memory resources are typically provided as internal, semiconductor, integrated circuits in computers or other electronic systems. There are many different types of memory, including volatile and non-volatile memory. Volatile memory can require power to maintain its data (e.g., host data, error data, etc.). Volatile memory can include random access memory (RAM), dynamic random-access memory (DRAM), static random-access memory (SRAM), synchronous dynamic random-access memory (SDRAM), and thyristor random access memory (TRAM), among other types. Non-volatile memory can provide persistent data by retaining stored data when not powered. Non-volatile memory can include NAND flash memory, NOR flash memory, and resistance variable memory, such as phase change random access memory (PCRAM) and resistive random-access memory (RRAM), ferroelectric random-access memory (FeRAM), and magnetoresistive random access memory (MRAM), such as spin torque transfer random access memory (STT RAM), among other types.

Electronic systems often include a number of processing resources (e.g., one or more processing resources), which may retrieve instructions from a suitable location and execute the instructions and/or store results of the executed instructions to a suitable location (e.g., the memory resources). A processing resource can include a number of functional units such as arithmetic logic unit (ALU) circuitry, floating point unit (FPU) circuitry, and a combinatorial logic block, for example, which can be used to execute instructions by performing logical operations such as AND, OR, NOT, NAND, NOR, and XOR, and invert (e.g., NOT) logical operations on data (e.g., one or more operands). For example, functional unit circuitry may be used to perform arithmetic operations such as addition, subtraction, multiplication, and division on operands via a number of operations.

Artificial intelligence (AI) can be used in conjunction memory resources. AI can include a controller, computing device, or other system to perform a task that normally requires human intelligence. AI can include the use of one or more machine learning models. As described herein, the term "machine learning" refers to a process by which a computing device is able to improve its own performance through iterations by continuously incorporating new data into an existing statistical model. Machine learning can facilitate automatic learning for computing devices without human intervention or assistance and adjust actions accordingly.

DETAILED DESCRIPTION

Figure 1:
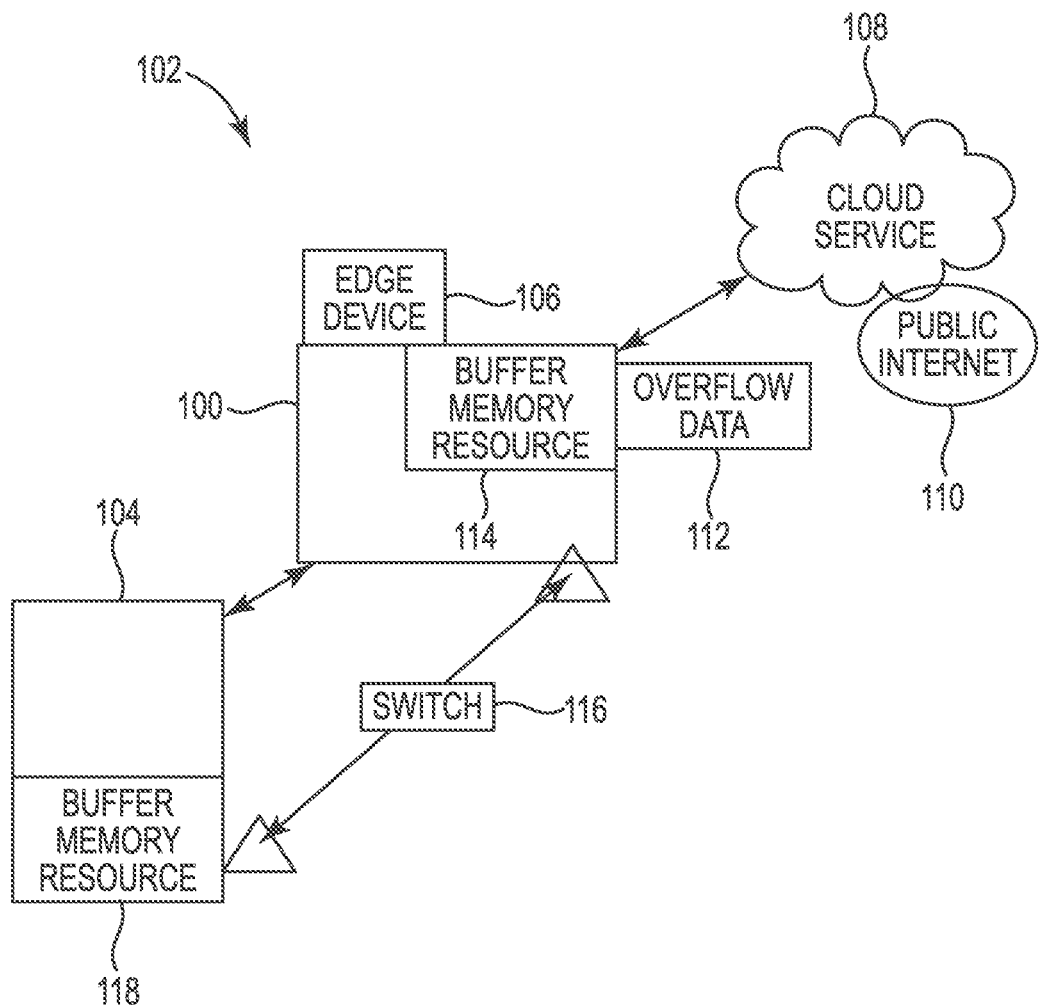
FIG. 1 is a functional diagram representing a system for data transmission management in accordance with a number of embodiments of the present disclosure.

Systems, devices, and methods related to data transmission management are described. In a shared memory multiprocessor system with a separate cache memory for each processor, it may be possible to have many copies of shared data. For instance, there may be one copy in a main memory and one in a local cache of each processor that requested it. When one of the copies of data is changed, the other copies may reflect that change. Cache coherence ensures that the changes in the values of shared data are propagated throughout the system with a desired timeliness. However, cache coherence may result in sharing of sensitive data, for instance, as data is shared throughout the system.

Examples of the present disclosure can allow for selective cache coherence such that some direct communication is enabled while sensitive data is isolated, for instance from a cloud service and/or public internet. Put another way, examples of the present disclosure allow for intentional splitting of cache coherence within the system using a gatekeeper-like device.

Examples of the present disclosure can include a method for data transmission management including receiving, from an edge device via a radio at a first device, instructions associated with data transmission between a second device in communication with the first device and a cloud service in communication with the first device. The method can include managing, at the first device and based on the instructions from the edge device, data received from a memory resource of the second device for transmission to the cloud service and data received from the cloud service for transmission to the memory resource of the second device. The method can also include enabling transmission of some, none, or all of the data between the cloud service and the memory resource of the second device and vice versa based on the management of the data.

In the following detailed description of the present disclosure, reference is made to the accompanying drawings that form a part hereof, and in which is shown by way of illustration how one or more embodiments of the disclosure can be practiced. These embodiments are described in sufficient detail to enable those of ordinary skill in the art to practice the embodiments of this disclosure, and it is to be understood that other embodiments can be utilized and that process, electrical, and structural changes can be made without departing from the scope of the present disclosure.

It is also to be understood that the terminology used herein is for the purpose of describing particular embodiments only and is not intended to be limiting. As used herein, the singular forms "a," "an," and "the" can include both singular and plural referents, unless the context clearly dictates otherwise. In addition, "a number of," "at least one," and "one or more" (e.g., a number of memory devices) can refer to one or more memory devices, whereas a "plurality of" is intended to refer to more than one of such things. Further-more, the words "can" and "may" are used throughout this application in a permissive sense (i.e., having the potential to, being able to), not in a mandatory sense (i.e., must). The term "include," and derivations thereof, means "including, but not limited to." The terms "coupled," and "coupling" mean to be directly or indirectly connected physically or for access to and movement (transmission) of commands and/or data, as appropriate to the context.

The figures herein follow a numbering convention in which the first digit or digits correspond to the figure number and the remaining digits identify an element or component in the figure. Similar elements or components between different figures can be identified by the use of similar digits. For example, 100 can reference element "00" in FIG. 1, and a similar element can be referenced as 200 in FIG. 2. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is a functional diagram representing a system 102 for data transmission management in accordance with a number of embodiments of the present disclosure. FIG. 1 illustrates a first device 100 in communication with a second device 104 and also in communication with a cloud service 108. While one first device 100, one second device 104, one switch 116, one edge device 106, and one cloud service 108 are illustrated in FIG. 1, more than one of the elements may be present in the system 102. The system 102 can maintain cache coherence with the exception of transmission of sensitive data; for instance, cache coherence can be intentionally split such that sensitive data is not shared with each element of system 102.

In such an example, the first device 100 can filter data transmission and act as a gatekeeper with respect to sensitive data. Put another way, the first device 100 can enable direct communication between the second device 104 and the cloud service 108, but sensitive data can be isolated from the cloud service 108. As used herein, sensitive data can include data considered to be classified information to be protected and inaccessible to outside parties unless specifically granted permission. Examples include personally identifiable information and protected health information. Other sensitive data may include sensor measurements, privileged server data (e.g., a baby monitor server), key, data associated with firmware (e.g., boot loaders), certain images, videos, words, or phrases. In some examples, sensitive data can be determined based on input from a user in communication with the first device 100 via the edge device 106.

The edge device 106, in some examples, may be a computing device having an application accessible by an authorized user such as a parent or caregiver of a user interacting with the second device 104. The first device 100 can receive input from the edge device 106 regarding sensitivity of data and machine learning at the second device 104, among others. For example, the authorized user may not want the user of the second device 104 hearing profanities coming from the cloud service 108 or public internet 110, or the authorized user may not want the user of the second device 104 exposing personal information to the cloud service 108 or public internet 110. The edge device 106 may receive prompts, in some instances, from the first device 100 requesting classification of particular data as sensitive or not sensitive. The authorized user, for instance, can receive and respond to the prompts via an application on a mobile device acting as the edge device 106. The first device 100 can manage the data (e.g., allow or prohibit transmission) based on the classification received.

An edge device, as used herein, includes a device (e.g., physical device) used for communication and interaction between devices on a network. Edge devices can mediate data in a network. Example edge devices include switching devices (also known as "switches"), routers, router/switching device combinations, models, access points, gateways, networking cables, network interface controllers, mobile devices, and hubs, among others. In some instances, an edge device can be or can include a controller. An edge device, in some examples of the present disclosure, can be a combination of hardware and instructions for transmitting instructions to a first device 100 that is part of the same network as the edge device (e.g., edge device 106). The hardware, for example can include a processing resource and/or a memory resource (e.g., MRM, computer-readable medium (CRM), buffer memory resource, data store, etc.).

The first device 100 can comprise a processing resource, a memory resource, a buffer memory resource 114, or any combination thereof. The first device 100, for instance, can receive data from the second device 104 and determine if it is sensitive data or non-sensitive data. The first device 100 can transmit non-sensitive data to the cloud service 108, but the first device 100 can prohibit sensitive data received from the second device 104 from being transmitted to the cloud service 108 and/or the public Internet 110. The sensitive data received at the first device 100 can be written to the buffer memory resource 114, while other non-sensitive data may be written as overflow data 112. The first device 100 can prohibit sensitive data from being written as overflow data 112 to protect the sensitive data from potential vulnerabilities.

The cloud service 108 can also receive from and/or transmit data to the first device 100 or other sources such as the public Internet 110. The first device 100 can determine if data received from the cloud service 108 is sensitive data or non-sensitive data. The first device 100 can transmit non-sensitive data to the second device 104, but the first device 100 can prohibit sensitive data received from the cloud service 108 from being transmitted to the second device 104. Data received at the first device 100 from the cloud service 108 that is deemed sensitive may be written to buffer memory resource 114, in some examples, or returned to the cloud service 108.

The second device 104, which in some examples is a system-on-a-chip (SoC) device, can receive from and/or transmit data to the first device 100 or a third party (not illustrated) such as a user interacting with second device 104. For example, the second device 104 can receive input to its hardware (e.g., a processing resource, a memory resource, etc.) and/or associated sensors. For instance, the second device 104 can include an interactive graphical user interface (e.g., a touchscreen), a camera, a microphone, and/or sensors such as voice, touch, sound, weather, temperature, health, motion, battery, or other sensors for receipt of data from the third party.

In some examples, the second device 104 can include a buffer memory resource 118 as the memory resource or as an additional, separate memory resource. Sensitive material (e.g., shown as triangles) received at the second device 104 can be written to the buffer memory resource and transmitted to the first device 100 via the switch 116.

In some examples, machine learning can be performed at the second device 104, for instance to improve accuracy of data the second device 104 outputs (e.g., information provided to a user of the second device 104). For example, the second device 104 may receive input data from a user interacting with the second device 104, from the cloud service 108 via the first device 100, from the edge device 106 via the second device 104, or any combination thereof. As the input data is received, the second device 104 may be updated using a machine learning model and output to the user may be improved. For example, a student using the second device 104 as a social cue advisor may benefit from the second device 104 updating itself via machine learning (e.g., supervised machine learning) with new social norms, phrases, etc. using input data received from the cloud service, while also updating based on progress of the student and input from a parent controlling the edge device 106 who has indicated additional norms the parent wants the student to learn.

The switch 116 can be opened or closed, for instance in response to instructions by the first device 100 to allow or prohibit transmission of data. The switch 116 can be part of a secure connection between the first device 100 and the second device 104. For instance, single-based error correction code (ECC) or double-based ECC (e.g., error detection and correction (EDC)) may be used to enable reliable transmission of data between the first device 100 and the second device 104. As noted, the second device 104 may be a system on a chip device including an integrated circuit (e.g., a "chip") that integrates all or most components of the second device 104. The ECCs can be, in some examples, inserted on the integrated circuit of the second device 104 and used as a signature to protect sensitive data. In some examples, reliable transmission of the data can be performed using a secure connection that includes a sensor located in a memory resource of the first device 100.

In a non-limiting example, the second device 104 can be a robot that interacts with a user (e.g., a child). For instance, the robot can help the user learn a second language, improve social skills, help with homework, provide cognitive assistance, provide motivation and/or moral support, or other assist with other learning. The robot can improve accuracy and efficiency with respect to teaching the user through machine learning (e.g., supervised machine learning). To enable machine learning, the robot accesses information from the cloud service 108 and/or the public Internet such as language information, social skill information, homework help, data associated with child development (e.g., growth charts, educational statistics, etc.), or any combination thereof. Additional data may also be accessed to enable machine learning. Data collected from the user may also be used in machine learning (e.g., current age, grade level, etc.).

Machine learning within the robot can personalize data for the user and improve the robot's performance. For instance, using data acquired from the cloud (e.g., big data), data acquired from the user, and input received via the edge device 106 (as will be discussed further herein), the robot can learn how the user is developing (e.g., as compared to average capabilities of a same age user), limitations of a user's learning, social norms, etc. In such an example, a parent or other caregiver may be concerned what the user is exposed to or what the user discloses to the robot. For instance, a child may inadvertently provide sensitive data to the robot such as a passcode or personally identifiable information. In response, the first device 100 can receive this sensitive data from the robot and filter it, such that the sensitive data is prohibited from transmission to the cloud service 108 or the public Internet 110. In some examples, if the robot has not learned that the data is sensitive, the robot can write the data to the buffer memory resource 118, for transmission to the first device 100 via the switch 116.

In an example, the cloud service 108 may transmit data meant for the robot via the first device 100 that includes inappropriate content for a user of the robot. In such examples, if the robot was to receive the data, the robot may be exposed to the potentially harmful data of the cloud service 108 (e.g., big data) and may detect patterns in data not detectable to the user. The robot may begin to learn manipulative or bad behavior from the data, and/or hackers may use the robot for malicious purposes. For instance, data received at the first device 100 for transmission to the robot may include an obscenity to which a parent may not want a child exposed. In such an example, the first device 100 can determine the data is sensitive and prohibit transmission to the robot and protect the system 102. For instance, the switch 116 between the first device 100 and the robot can be closed prohibiting transmission of sensitive data to (and from) the robot. The sensitive data can be stored at the buffer memory resource 114 to avoid threats exposed when sensitive data is stored as overflow data at 112 such as stolen or altered communication, tampering of memory, stolen sensitive data, altering firmware, impersonation of valid devices, etc.

The first device 100 can be in communication with an edge device 106 such as a mobile device in the robot example. The first device 100 can receive instructions, for instance via an application installed on the edge device 106, associated with teachings performed by the robot. For instance, a parent may instruct the first device 100 to teach the child a second language, but to omit swear words both in the child's first language and the second language being taught. The first device 100 may also receive instructions with respect to data not to be shared with the cloud service 108, such as passwords, addresses, or other potentially sensitive data. In such examples, cloud training or machine learning for the robot is controlled via the edge device 106.

The edge device 106, in some examples, may receive prompts from the first device 100 when the robot is unsure about a particular input data. For instance, the cloud service 108 may send a term the robot does not know, or the user may input data the robot indicates may be sensitive (e.g., an address). In such an example, the first device 100 can prompt the edge device 106 for a decision on the input data with respect to allowing or prohibiting its transmission. Such responses can be used for training a machine learning model used by the robot.

In some examples, the edge device 106 can receive reports associated with the user of the robot. For instance, a parent may receive an update of a child's learning curve with respect to the second language learning (e.g., progression of development) as compared to other children, updates on the child's interest, reports on how the child best learns, intellectual and emotional maturity updates, or an updated lesson plan based on the robot's machine learning. The machine learning can be supervised, for instance, using input data from the cloud service 108, input from the user, and additional input submitted via the edge device 106. The robot, in some examples, may include base settings associated with baseline behaviors such as prohibiting encouragement of illegal activities.

Figure 2:
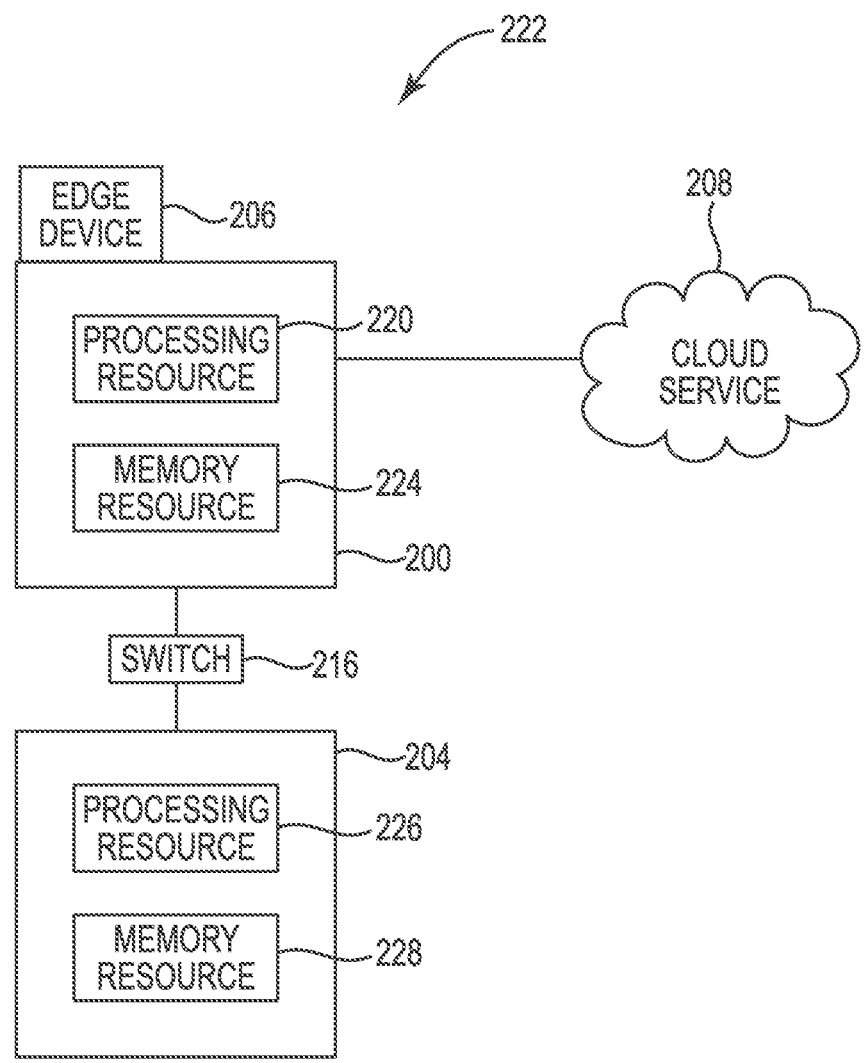
FIG. 2 is a system diagram including a first device in communication with a cloud service and a second device for data transmission management in accordance with a number of embodiments of the present disclosure.

FIG. 2 is a system diagram including a first device 200 in communication with a cloud service 208 and a second device 204 for data transmission management in accordance with a number of embodiments of the present disclosure. The system 222 can include the first device 200 in communication with the second 220 via a switch 216. While one first device 200, one second device 204, one cloud service 208, and one switch 216 are illustrated in FIG. 2, more of each device may be present as a part of the system 222.

The first device 200 can include a processing resource 220 and a memory resource 224 having instructions written thereon and executable by the processing resource 220. The first device 200 can be a gatekeeping device for managing data transmission between the second device 204 and the cloud service 208. For instance, the first device 200 can receive data from the cloud service 208, the second device 204, and/or an edge device 206 and determine whether or not to transmit the data and to where the data can be transmitted.

In some examples, the instructions can be executable by the processing resource 220 to receive from an edge device 206, instructions associated with data transmission between a second device 204 in communication with the first device 200 and the cloud service 208. The edge device 206, for instance, can include a computing device in communication with the first device 200 via an application installed on the computing device. For instance, the second device 204 may interact with a user for educational, companionship, or other purposes. In such an example, the first device 200 can receive instructions from the edge device 206 associated with data that can and cannot be transmitted to and from the second device 204. For instance, if the user is a small child, a parent may access the edge device 206 (e.g., via an application on a mobile device) and provide instructions associated with what the child can be exposed to and what data the child can share for transmission to the cloud service 208.

The instructions, in some examples, can be executable to manage, based on the instructions from the edge device 206, data received from the memory resource 228 of the second device 204 for transmission to the cloud service 208 and data received from the cloud service 208 for transmission to the memory resource 228 of the second device 204. For instance, the first device 200 may receive data from the cloud service 208 for transmission to the second device 204. The first device 200 may recognize the data as safe and transmit the data to the second device 204. Alternatively, the first device 200 may recognize the data as sensitive and prohibit transmission of the data to the second device 204. The first device 200 may recognize the data as safe or sensitive, for instance, based on instructions received from the edge device 206. In the previous example, this may include a parent previously restricting transmission of data containing swear words via the edge device 206. In such an instance, the first device 200 may write the sensitive data to a buffer memory resource to protect it.

In some examples, the first device 200 may not recognize the data as safe or sensitive. In such an example, the first device 200 may request classification from the edge device 206. The edge device 206 can prompt a user (e.g., a parent) for the classification. Upon receiving a classification response from the edge device 206, the first device 200 can allow or prohibit transmission of the data from the cloud service 208 to the memory resource 228 of the second device 204.

In a similar example, the first device 200 may receive data from the second device 204 for transmission to the cloud service 208, and the first device 200 can determine whether or not to allow or prohibit transmission of the data. Put another way, the instructions can be executable by the processing resource 220 to enable transmission of some, none, or all of the data between the cloud service 208 and the memory resource 228 of the second device 204 and vice versa based on the management of the data.

The second device 204, which in some instances can be an SoC device, an Internet of Things device, or a remote device, can be in communication with the first device 200 via a switch 216. The switch 216 can be part of a secure connection between the first device 200 and the second device 204. For instance, single-based ECC or double-based ECC (e.g., EDC) may be used to enable reliable transmission of data between the first device 100 and the second device 204. The ECCs can be, in some examples, inserted on an integrated circuit of the second device 204 and used as a signature to protect sensitive data. In some examples, reliable transmission of the data can be performed using a secure connection that includes a sensor located in the memory resource 224 of the first device 200.

The second device can include a processing resource 226 and a memory resource 228 having instructions written thereon and executable by the processing resource 226. The instructions, for example, can be executable by the processing resource 226 to determine content of the input data received at the processing resource 226, the memory resource 228, or both, and transmit output data to the first device 200, a user of the second device 204, or both based on the determined content of the input data using a machine learning model.

For example, a user may interact with the second device 204 via verbal communication, a touchscreen, or other sensors or communication techniques. The second device 204 can determine the content of input received during the interaction based on a machine learning model built and updated using data from the user, the cloud service 208, and the edge device 206.

For instance, the user may ask the second device 204 what a particular word means. If the second device 204 recognizes the particular word, it can transmit it to the first device 200 via an open switch 216. The second device 204 may have stored in the memory resource 228 or other storage (e.g., buffer storage) a definition of the particular word, and the second device 204 can output that definition to the user. The first device 200 can retrieve from the cloud service 208 additional data associated with the particular word, filter the content of the additional data, and send appropriate data to the second device 204 via the open switch 216.

Using the same example, if the second device 204 recognizes the particular word as a prohibited word, the second device 204 can output communication suggesting the user not speak that particular word. The second device 204 can include a buffer memory resource, a cache device, or both, and the memory resource 228 can execute instructions to write the particular word to the buffer memory resource or the cache device for storage locally at the second device 204.

Using the same example, if the second device 204 does not recognize the particular word, the second device 204 can write the particular word to a buffer memory resource and transmit the particular word to the first device 200. The first device 200 can request from the edge device 206 permission to transmit the particular word or a request for definition of the particular word to the cloud service 208. If the particular word is allowed based on a response to the request, the first device 200 can allow transmission to the cloud service 208 and filter the returning data before transmitting the definition to the second device via the switch 216. If the particular word is denied based on the response, the first device 200 can write the associated data to a buffer memory resource, and the machine learning model can be updated with the particular word, so it is blocked in the future. The first device 200 can also act as a gatekeeper in a similar manner with respect to data coming from the cloud service 208 for transmission to the memory resource 228 of the second device 204.

In such an example, the memory resource 228 can include executable instructions to temporarily disable the second device 204 responsive to the first device 200 determining data received from the second device 204 comprises at least a portion of data of unknown content. For instance, if the second device 204 does not recognize the particular word and the first device 200 does not recognize the particular word, the second device 204 can be temporarily disable, so the user cannot interact with the second device 204 until a decision is reached regarding the particular word.

In some examples, the machine learning model can be updated using the input data received at the processing resource 226, the memory resource 228, or both, additional input data received at the processing resource 226, the memory resource 228, or both, the instructions received by the first device 200 from the edge device 206, additional instructions received by the first device 200 from the edge device; and data received at the first device 200 from the cloud service and transmitted to the second device 204. Such input data can include for instance, input data received from a user at the processing resource 226, the memory resource 228, or both (e.g., address, phone number, questions from the user, etc.), instructions from a parent or caregiver regarding types of information to share with the user or allowed to be shared by the user (e.g., banned subjects or words, additional manners to be taught, additional cognitive data, etc.), addition instructions from the parent or caregiver such as responses to requests from the first device 200, and big data and/or other data from the cloud service 208 that is associated with instructing the user and updating the machine learning model.

In some examples, the memory resource 228 can include executable instructions to compare input data received at the processing resource 226, the memory resource 228, or both to associated data received at the first device 200 from the cloud service 208 and transmitted to the second device 204. The results of the comparison can be transmitted to the first device 200 for transmission to the edge device 206. For instance, a parent may wonder how their child is developing compared to other children of the same age. The instructions can be executed to compare child development data received at the first device 200 from the cloud service 208 to input data received from the child. For instance, the second device 204 can track the child's reading skills and compare those skills to data from the cloud device 208. The second device 204 can then transmit results of the comparison to the first device 200 for reporting to the edge device 206 (e.g., and the parent operating the edge device 206).

In some examples, the memory resource 224 of the first device 200 can include executable instructions to determine a sensitivity level of the data received from the cloud service 208 for transmission to the memory resource 228 of the second device 204. Similar, the memory resource 224 can include executable instructions to determine a sensitivity level of the data received from the memory resource 228 of the second device 204 for transmission to the cloud service 208. In such examples, the switch 216 can be opened or closed to allow or prohibit transmission of the data based on the determined sensitivity level(s). As used herein, a sensitivity level can include a classification of sensitive the data is to be transmitted is.

For instance, with respect to a young child, an image of a kitten may have a low sensitivity level, while violent imagery may have a high sensitivity level. These sensitivity levels may be determined based on input received at the second device 200 via the edge device (e.g., parent/caregiver input), data received at the second device 200 from the cloud service 208 (e.g., movie age ratings, video game age ratings, etc.), or as default settings on the second device 204 (e.g., criminal activities banned in manufacturer settings). A particular threshold sensitivity level may be determined and transmitted to the second device 200, for instance from the edge device 206, and used as a filter for allowing or prohibiting transmission of data between the first device 200 and the second device 204.

For instance, the switch 216 can be opened to allow transmission of the data to the memory resource 228 responsive to the sensitivity level being below a particular threshold, and the switch 216 can be closed to prohibit transmission of the data to the memory resource 228 responsive to the sensitivity level being at or above the particular threshold. Similar, the switch 216 can be opened to allow transmission of the data to the cloud service 208 responsive to the sensitivity level being below a particular threshold, and the switch 216 can be closed to prohibit transmission of the data to the cloud service responsive to the sensitivity level being at or above the particular threshold. In some examples, the determination of the sensitivity level can be made at the second device 204.

Figure 3:
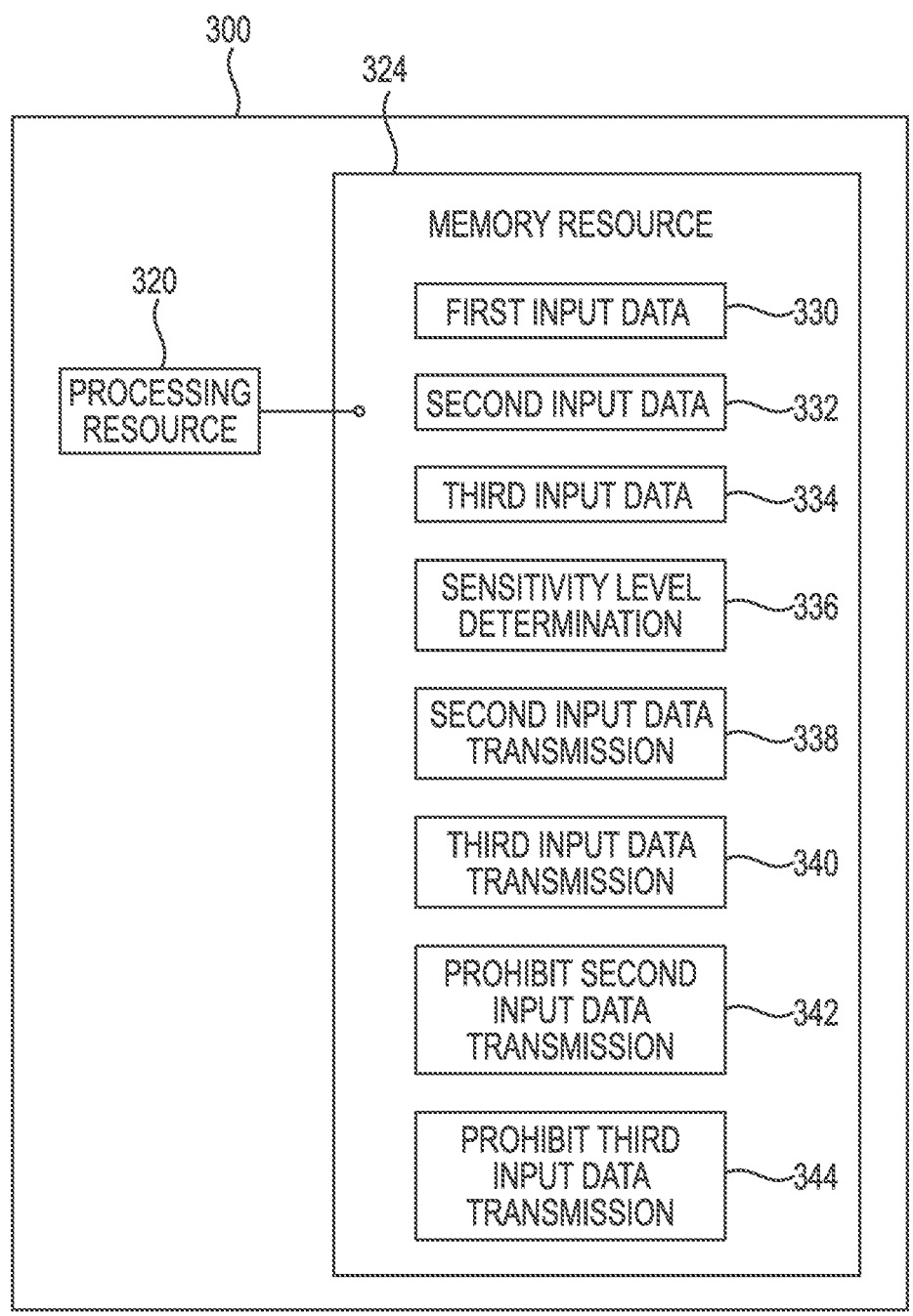
FIG. 3 is another functional diagram representing a processing resource in communication with a memory resource having instructions written thereon in accordance with a number of embodiments of the present disclosure.

FIG. 3 is another functional diagram representing a processing resource 320 in communication with a memory resource 324 having instructions 330, 332, 334, 336, 338, 340, 342, 344 written thereon in accordance with a number of embodiments of the present disclosure. In some examples, the processing resource 320 and the memory resource 324 comprise a device 300 such as a device 100 or 200 illustrated in FIGS. 1 and 2, respectively.

The system 330 illustrated in FIG. 3 can be a server or a computing device (among others) and can include the processing resource 320. The system 330 can further include the memory resource 324 (e.g., a non-transitory MRM), on which may be stored instructions, such as instructions 330, 332, 334, 336, 338, 340, 342, 344. Although the following descriptions refer to a processing resource and a memory resource, the descriptions may also apply to a system with multiple processing resources and multiple memory resources. In such examples, the instructions may be distributed (e.g., stored) across multiple memory resources and the instructions may be distributed (e.g., executed by) across multiple processing resources.

The memory resource 324 may be electronic, magnetic, optical, or other physical storage device that stores executable instructions. Thus, the memory resource 324 may be, for example, non-volatile or volatile memory. In some examples, the memory resource 324 is a non-transitory MRM comprising RAM, an Electrically-Erasable Programmable ROM (EEPROM), a storage drive, an optical disc, and the like. The memory resource 324 may be disposed within a controller and/or computing device. In this example, the executable instructions 330, 332, 334, 336, 338, 340, 342, 344 can be "installed" on the device. Additionally, and/or alternatively, the memory resource 324 can be a portable, external or remote storage medium, for example, that allows the system to download the instructions 330, 332, 334, 336, 338, 340, 342, 344 from the portable/external/remote storage medium. In this situation, the executable instructions may be part of an "installation package". As described herein, the memory resource 324 can be encoded with executable instructions for data transmission management.

The instructions 330, when executed by a processing resource such as the processing resource 320 can include instructions to receive, via a radio, first input data from an edge device. As used herein, the use of a radio can include the transmission and/or reception of information through intervening media (e.g., air, space, nonconducting materials, etc.). This can include, for instance, radio waves or other wireless communication and/or signaling including but not limited to cellular communication, one-way communication, two-way communication, radar, radiolocation, radio remote control, satellite communication, Wi-Fi, 3G, 4G, 5G, and/or other communication standards, among others. The first input data can include instructions regarding operation of an SoC device in communication with the device 300. For instance, the SoC device may be used to assist in the education of a child or other user, and the instructions from the edge device can include education paths and expectations set by parents, teachers, caregivers, etc.

The instructions 332, when executed by a processing resource such as the processing resource 320, can include instructions to receive, via the radio, second input data from a cloud service. The second input data can include data associated with the education of the child or other user. For instance, if the instructions are to teach the child or other user French, the second input data can include data associated with the French language and teaching the French language, among other data.

The instructions 334, when executed by a processing resource such as the processing resource 320, can include instructions to receive, via the radio, third input data from an SoC device. The third input data may include, for instance, input from the child or other user and/or data stored at the SoC device associated with the child or other user (e.g., previously received data from the child or other user).

The instructions 336, when executed by a processing resource such as the processing resource 320, can include instructions to determine a sensitivity level of the second input data and a sensitivity level of the third input data using the first input data and based on a comparison of the second input data and the third input data to a database. For example, using the French language example, the first input data may indicate French swear words are not to be taught to the child or other user. Sensitivity levels can be determined based on those instructions (e.g., filter any second or third input data including swear words), using the database as reference (e.g., a database of swear words for comparison to the second and third input data).

The instructions 338, when executed by a processing resource such as the processing resource 320, can include instructions to allow transmission of the second input data to the SoC device responsive to the sensitivity level of the second input data being below a particular threshold. In the French language example, this may include the second input data from the cloud service including safe French words, and thus being allowed transmission to the SoC device. The particular threshold can be based on sensitivity threshold data within the first input data, so in the aforementioned example, because the first input data instructions restricted swear words, only non-swear words may be allowed transmission.

The instructions 340, when executed by a processing resource such as the processing resource 320, can include instructions to allow transmission of the third input data to the cloud service responsive to the sensitivity level of the third input data being below the particular threshold. Using the French language example, the third input data may include the child or other user speaking a sentence in French that includes the name of the state in which they reside. This third input data may fall below the sensitivity level particular threshold and can be allowed transmission to the cloud service.

The instructions 342, when executed by a processing resource such as the processing resource 320, can include instructions to prohibit transmission of the second input data to the SoC device and write the second input data to the memory resource 324 or a buffer memory resource of the device 300 responsive to the sensitivity level of the second input data being at or above the particular threshold. Staying with the French language example, the second input data from the cloud service may include French profanities. The device 300 can determine the sensitivity levels of the profanities are too high, and can prohibit transmission of the profanities, while writing the data associated with the profanities to the memory resource 324 or the buffer memory resource. This stored data can be used to update a machine learning model at the SoC device to improve accuracy and efficacy of the SoC device's performance.

The instructions 344, when executed by a processing resource such as the processing resource 320, can include instructions to prohibit transmission of the third input data to the cloud service and write the third input data to the memory resource 324 or a buffer memory resource of the device 300 responsive to the sensitivity level of the third input data being at or above the particular threshold. Staying with the French language example, the third input data may include the child or other user speaking a sentence in French that includes the home address at which they reside. This third input data may be too sensitive and may exceed the sensitivity level particular threshold. As such, transmission is prohibited, and the third input data can be written to the memory resource 324 or a buffer memory resource of the device 300. This stored data can be used to update a machine learning model at the SoC device to improve accuracy and efficacy of the SoC device's performance.

In some examples, the memory resource 324 can include instructions executable to enable transmission of additional data between the cloud service and the SoC device to facilitate supervised machine learning at the SoC device. For example, transmission of statistical data, educational approaches, or other data applicable to the learning of the child or other user may be enabled to update and improve a machine learning model used at the SoC device.

The memory resource 324, in some examples, can include instructions executable to maintain cache coherence between the device 300, the SoC device, and the cloud service excepting the second and the third input data having sensitivity levels at or above the particular threshold. For instance, cache coherence can allow for changes in the values of shared data between the device 300, the SoC device, and the cloud service are propagated throughout the system with a desired timeliness. However, the second and the third input data having sensitivity levels at or above the particular threshold are excluded and intentionally split from the cache coherence to protect the child or the other user, for example.

Figure 4:
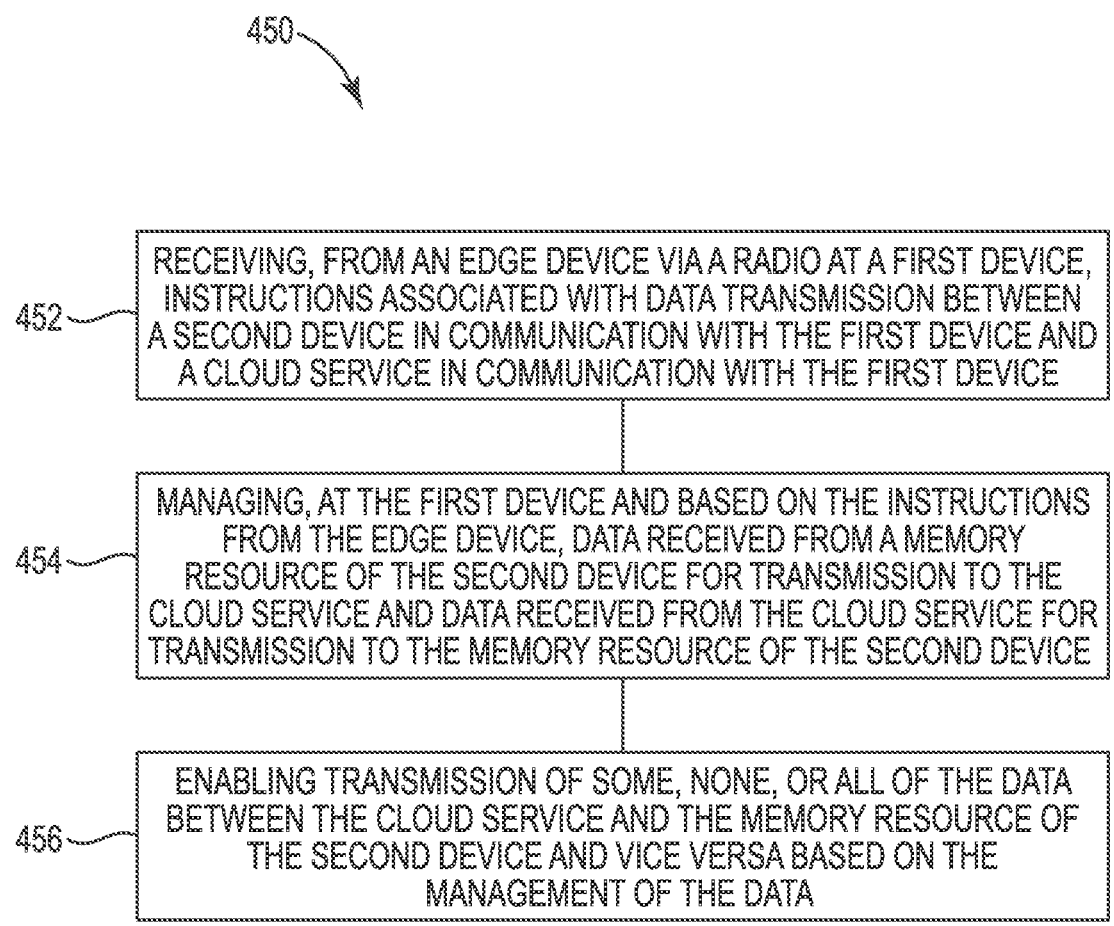
FIG. 4 is a flow diagram representing an example method for data transmission management in accordance with a number of embodiments of the present disclosure.

FIG. 4 is a flow diagram representing an example method 450 for data transmission management in accordance with a number of embodiments of the present disclosure. The method 450 may be performed, in some examples, using a system such as systems 102 and 222 and/or a device such as device 300 as described with respect to FIGS. 1-3.

At 452, the method 450 includes receiving, from an edge device via a radio at a first device, instructions associated with data transmission between a second device in communication with the first device and a cloud service in communication with the first device. For example, the instructions associated with the data transmission can include instructions regarding operation and allowed communication to and from the second device in communication with the first device. For instance, the second device may be used to assist in the education of a child or other user, and the instructions from the edge device can include education paths and expectations set by parents, teachers, caregivers, etc., and/or restrictions on transmission of data between the cloud service and the second device.

At 454, the method 450 includes managing, at the first device and based on the instructions from the edge device, data received from a memory resource of the second device for transmission to the cloud service and data received from the cloud service for transmission to the memory resource of the second device. Managing the data, for instance, can include determining how and what data received at the first device can be transmitted to the cloud service and/or the second device.

For example, managing the data can include determining the data comprises a protected portion of data, writing the protected portion of data to a memory resource of the first device, and maintaining cache coherence between the first device, the second device, and the cloud service excepting the protected portion of data. The protected portion of data can include sensitive data not to be shared with the cloud service or with the child or other user. For instance, instructions from the edge device may restrict particular reading materials that may be exposed to the child or other user and/or the instructions from the edge device may restrict sensitive data that the child or other user inputs to the second device (e.g., address, birthday, Social Security Number, etc.). To maintain security of the protected portion of data, it can be written to the memory resource (e.g., buffer memory), while avoiding writing the protected portion of data as overflow data so as to reduce attacks on the data. Cache coherence is maintained excepting the protected portion of data to maintain security of the sensitive data.

Managing the data, in some examples, can include identifying and filtering protected data from the data received from the memory resource of the second device for transmission to the cloud service and data received from the cloud service for transmission to the memory resource of the second device. For instance, using the aforementioned examples, protected data such as a child's address may be filtered from data received at the second device, while remaining, non-protected data is transmitted to the cloud service. Similar, protected data such as restricted reading material data received from the cloud service is filtered, while other non-protected data is allowed transmission. In some examples, the method 450 can include the first device transmitting and receiving data to and from the second device via a secure connection comprising a sensor located in a memory resource of the first device, a single-based ECC a double-based ECC (e.g., EDC), or any combination thereof. For instance, protected data may be transmitted in such a way to maintain security of the data.

Managing the data, in some examples, can include determining the data comprises a portion of data of unknown content, transmitting the portion of data of unknown content to the edge device via the radio or a different radio, and transmitting the portion of data of unknown content to the cloud service, to the memory resource of the second device, or writing the portion of data of unknown content to a memory resource of the first device. Unknown content, for instance may include data received at the second device that is not recognized. For instance, a child or other user may ask the definition of a word that the second device does not know. Data associated with the word may be received and transmitted to the edge device for instructions on how to proceed. Data associated with an allowed word may be transmitted to the cloud service, while data associated with a prohibited word may be written to the memory resource and prohibited from being transmitted to the cloud device.

The method 450, at 456, includes enabling transmission of some, none, or all of the data between the cloud service and the memory resource of the second device and vice versa based on the management of the data. For instance, non-protected (e.g., non-sensitive) data can be transmitted, while protected (e.g., sensitive) data is not transmitted. In some examples, data received from the cloud service and/or from the second device may be a combination of protected and no-protected data, such that a portion of the data is allowed transmission, while remaining data is denied transmission.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   receiving, from a mobile device via a radio at a first device, instructions associated with data transmission between a second device in communication with the first device and a cloud service in communication with the first device;
   receiving data at the first device from the cloud service;
   receiving data at the first device from a memory resource of the second device;
   managing, at the first device and based on the instructions from the mobile device, the data received from the memory resource of the second device for transmission to the cloud service and the data received from the cloud service for transmission to the memory resource of the second device; and
   enabling transmission of some, none, or all of the data between the cloud service and the memory resource of the second device and vice versa based on the management of the data, wherein:
enabling transmission comprises:
determining a sensitivity level of the data received from the cloud service for transmission to the memory resource of the second device by comparing the data to a database; and
opening a switch to allow transmission of the data to the memory resource of the second device responsive to the sensitivity level being below a particular threshold; and
disabling transmission comprises:
determining the sensitivity level of the data received from the cloud service for transmission to the memory resource of the second device by comparing the data to a database; and
closing the switch to prohibit transmission of the data to the memory resource of the second device responsive to the sensitivity level being at or above the particular threshold.

2. The method of claim 1, wherein managing the data comprises:
determining the data comprises a protected portion of data;
writing the protected portion of data to a memory resource of the first device; and
maintaining cache coherence between the first device, the second device, and the cloud service excepting the protected portion of data.

3. The method of claim 1, wherein managing the data comprises identifying and filtering protected data from the data received from the memory resource of the second device for transmission to the cloud service and data received from the cloud service for transmission to the memory resource of the second device.

4. The method of claim 1, wherein managing the data comprises:
determining the data comprises a portion of data of unknown content;
transmitting the portion of data of unknown content to the mobile device via the radio or a different radio; and
transmitting the portion of data of unknown content to the cloud service, transmitting the portion of data of unknown content to the memory resource of the second device, or writing the portion of data of unknown content to a memory resource of the first device.

5. The method of claim 1, further comprising the first device transmitting and receiving data to and from the second device via a secure connection comprising a sensor located in a memory resource of the first device.

6. The method of claim 1, further comprising the first device transmitting and receiving data to and from the second device via a secure connection comprising a single-based error correction.

7. The method of claim 1, further comprising the first device transmitting and receiving data to and from the second device via a secure connection comprising a double-based error correction.

8. A system, comprising:
a mobile device in communication with a first device configured to send instructions associated with data transmission between a second device in communication with the first device and a cloud service in communication with the first device;
the first device, comprising:
a first processing resource; and
a first memory resource having instructions written thereon and executable by the first processing resource to:
receive the instructions associated with data transmission;
receive data from the cloud service;
receive data from a second memory resource of the second device;
manage, based on the instructions associated with data transmission from the mobile device, the data received from the second memory resource of the second device for transmission to the cloud service and the data received from the cloud service for transmission to the second memory resource of the second device; and
enable transmission of some, none, or all of the data between the cloud service and the second memory resource of the second device and vice versa based on the management of the data, wherein the instructions to enable or disable transmission comprise instructions executable to:
compare the data to a database to determine a sensitivity level of the data received from the cloud service for transmission to the second memory resource of the second device;
open a switch to allow transmission of the data to the second memory resource responsive to the sensitivity level being below a particular threshold; and
close the switch to prohibit transmission of the data to the second memory resource responsive to the sensitivity level being at or above the particular threshold.

9. The system of claim 8, further comprising the first memory resource having instructions written thereon and executable by the first processing resource to:
determine the data comprises a protected portion of data;
write the protected portion of data to a memory resource of the first device; and
maintain cache coherence between the first device, the second device, and the cloud service excepting the protected portion of data.

10. The system of claim 8, further comprising the first memory resource having instructions written thereon and executable by the first processing resource to identify and filter protected data from the data received from the second memory resource for transmission to the cloud service and data received from the cloud service for transmission to the second memory resource of the second device.

11. The system of claim 8, further comprising the first memory resource having instructions written thereon and executable by the first processing resource to:
determine the data comprises a portion of data of unknown content;
transmit the portion of data of unknown content to the mobile device via the radio or a different radio; and
transmit the portion of data of unknown content to the cloud service, transmit the portion of data of unknown content to the second memory resource, or write the portion of data of unknown content to the first memory resource.

12. The system of claim 8, further comprising the first device to transmit and receive data to and from the second device via a secure connection comprising a sensor located in the first memory resource.

13. The system of claim 8, further comprising the first device to transmit and receive data to and from the second device via a secure connection comprising a single-based error correction.

14. The system of claim 8, further comprising the first device to transmit and receive data to and from the second device via a secure connection comprising a double-based error correction.

15. The system of claim 8, further comprising the second device in communication with the first device via a switch and comprising:
 a second processing resource; and
  the second memory resource having instructions written thereon and executable by the second processing resource to:
   determine content of the input data received at the second processing resource, the second memory resource, or both; and
   transmit output data to the first device, a user of the second device, or both based on the determined content of the input data using a machine learning model.

16. The system of claim 15, further comprising the second memory resource having instructions written thereon and executable by the second processing resource to update the machine learning model using:
 the input data received at the second processing resource, the second memory resource, or both;
 additional input data received at the second processing resource, the second memory resource, or both;
 the instructions received by the first device from the mobile device;
 additional instructions received by the first device from the mobile device; and
 data received at the first device from the cloud service and transmitted to the second device.

* * * * *